June 27, 1961  S. A. SCHERBATSKOY  2,990,475
DETERMINING THE PROXIMITY OF A RADIATION SOURCE
Filed Sept. 28, 1955  2 Sheets-Sheet 1

INVENTOR.
Serge A Scherbatskoy

June 27, 1961  S. A. SCHERBATSKOY  2,990,475
DETERMINING THE PROXIMITY OF A RADIATION SOURCE
Filed Sept. 28, 1955  2 Sheets-Sheet 2

*INVENTOR.*
Serge A. Scherbatskoy

United States Patent Office 2,990,475
Patented June 27, 1961

2,990,475
DETERMINING THE PROXIMITY OF A RADIATION SOURCE
Serge A. Scherbatskoy, 804 Wright Bldg., Tulsa 3, Okla.
Filed Sept. 28, 1955, Ser. No. 537,145
4 Claims. (Cl. 250—83.3)

This invention relates to location of sources of gamma rays that are embedded in an absorbing medium and has an application in radioactivity exploration such as utilized in prospecting the earth's surface for mineral deposits.

A number of methods have been proposed for exploring and locating sources of radioactivity. These methods have been based on the measurements of the intensity of radiation emitted by such sources at various remote points. While such measurements are of value, they do not give sufficient information regarding the location or presence of a source of radioactivity.

One object of my invention is to provide an improved method of locating sources of radioactivity and accordingly I propose to measure the spectral composition of the radiation received from said source.

Another object of my invention is the provision of a novel method of making radioactivity surveys wherein large areas can be quickly explored.

Further objects and advantages of the invention will be apparent from the following description and claims taken in connection with the attached drawings wherein:

Figure 1:
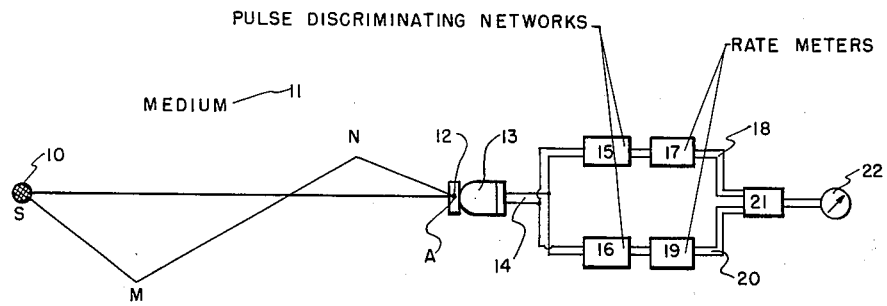
FIG. 1 illustrates the general arrangement of my invention including the source of radiation and the detecting equipment.

Referring now to FIG. 1, numeral 10 designates a source of gamma rays such as $Co^{60}$ emitting substantially monochromatic gamma rays of energy 1.2 mev. This source is located at the point S. The medium 11 surrounding the source 10 may be gaseous (such as air) liquid, or solid. A gamma ray detecting element 12 is placed in the medium 11 at a point A suitably distant from the source 10. Let $d$ designate the distance SA from the source 10 to the detecting element 12. The detecting element 12 may be a sodium iodide crystal or anthracene crystal or any other substance that is adapted to scintillate in response to incident gamma rays. The crystal 12 is sufficiently large so as to absorb substantially completely any incoming photon and to emit a flash of light, the intensity of which is proportional to the energy of said photon. The crystal 12 cooperates with a photomultiplier 13 and we thus obtain across the output terminals 14 of the photomultiplier a succession of pulses having magnitudes proportional to the energy of the photons intercepted by the crystal 12. These impulses are applied to a high gate 15 and a low gate 16. The high gate is a pulse discriminating network that is adapted to transmit large impulses within a relatively narrow range of magnitude. These large impulses should comprise the energy 1.2 mev. of the photons emitted by the source 10. For practical purposes we may assume that the high gate 15 transmits impulses corresponding to the energy range from 1.0 mev. to 1.2 mev. The output of the high gate 15 is connected to a ratemeter 17 which produces across its output terminals 18 a D.C. voltage having a magnitude representing the number of photons within the energy range from 1.0 mev. to 1.2 mev. incident upon the crystal 12.

The low gate 16 is a pulse discriminating network that is adapted to transmit the impulses of smaller magnitudes corresponding to a relatively wide energy spectrum comprising all energies below 1 mev. The output of the low gate 16 is connected to a ratemeter 19 which produces across its output terminals 20 a D.C. voltage having a magnitude representing the number of photons having an energy below 1 mev. and incident upon the crystal 12.

The leads 18 and 20 are applied to an electronic divider 21, said electronic divider producing across its output terminals a D.C. voltage having a magnitude representing the ratio of the magnitude of the voltage across the leads 18 to the magnitude of the voltage across the leads 20. This ratio is indicated on a meter 22 connected to the output of the electronic divider 21.

The illustration of FIG. 1 is distorted as to scale, and the various magnitudes are not represented in their proper proportions. Namely, the distance $d$ from the source to the detector is relatively large, considerably larger (possibly by a factor of ten or a hundred or a thousand) than the dimensions of the detecting element 12 or of the dimensions of all the electronic equipment associated with the detecting element 12. We further assume that the natural background activity due to the medium 11 is negligible as compared to the activity of the source 10 and therefore the medium 11 will be primarily an absorber and scatterer of the radiation emitted by the source 10.

The radiation arriving at the detecting element 12 may be visualized as being due to radiations from two different sources: (a) that part of the radiation that comes directly from the source 10 to the detector 12 as primary radiation; and (b) the remainder of the radiation that comes from the irradiated volume of the surrounding medium as secondary radiation. Several factors serve to limit the effective volume of the surrounding medium that acts as a secondary source. The path length of the incident plus the scattered photons in the surrounding medium will be greater for oblique rays and therefore such photons have a greater probability of being absorbed. In addition, the angle between the incident and the scattered photon must be greater for oblique rays and hence, the photon energy smaller. This latter factor also increases the probability of absorption of the photon.

The primary radiation arriving at the crystal 12 consists of photons having energy 1.2 mev. emitted by the source 10 that traverse the medium 11 without any single interaction along a straight line SA and arrive at the detecting element 12. The essential characteristics of these photons is that they did not suffer any degradation in energy during their travel and therefore the directly emitted photons arriving at the crystal 12 have their original energy of 1.2 mev.

The photons emitted by the source 10 that do not arrive directly at the crystal 12 undergo one or more Compton scatterings in the medium 11, thus giving rise to secondary photons, and a portion of said secondary photons reaches the crystal 12. This situation is illustrated by means of a line SMNA representing the path. The photon emitted by the source 10 and having energy 1.2 mev. underwent a Compton scattering at the point M giving rise to a secondary photon emitted in the direction MN. As a result of such scattering the energy of the secondary photon was degraded and is below the value of 1.2 mev. The secondary photon underwent another scattering at the point N giving rise to a tertiary photon which arrived at the crystal 12 along the path NA. During said further scattering, the energy of the tertiary photon was further degraded. Thus the dynamics of the penetration of the gamma rays emitted by the source 10 into the surrounding medium is governed by an ever increasing accumulation of secondary, tertiary, etc. photons with energies below that of the photons originally emitted by the source 10.

Let $N_d$ and $N_s$ designate the number of direct and of scattered photons respectively arriving at the crystal 12. We shall now examine how the values $N_d$ and $N_s$ vary if the distance $d$ from the source 10 to the detecting element 12 increases. It is well known that as $d$ increases the probability that a photon emitted at the source 10 arrives at the detecting element 12 unscattered decreases and the number of direct photons is expressed by the well known relationship $$N_d \alpha \frac{e^{-\mu d}}{d^2} \qquad (1)$$

where $\mu$ is the coefficient of absorption of the medium and $d$ represents the depth of penetration expressed in relaxation lengths.

In considering the number $N_s$ of scattered degraded photons constituting the secondary radiation incident on the crystal 12 we should take into the account the fact that the degraded secondary rays include more and more of the spectrum as the penetration $d$ progresses and the main characteristic of deep penetration is the variation of the intensity level of these secondary rays as a function of depth. Thus the variation of the total number of photons $N_t$ with the distance follows the trend $$N_t \alpha d^K \frac{e^{-\mu d}}{d^2} \qquad (2)$$

where $K$ is a constant that is experimentally determined. This constant depends on the energy of the gamma rays emitted by the source 10 and on the nature of the medium 11. Thus, for instance, for gamma rays having energies 1.2 mev. for a medium such as soil $K=1.5$. For a different medium such as lead $K=0.68$.

Figure 2:
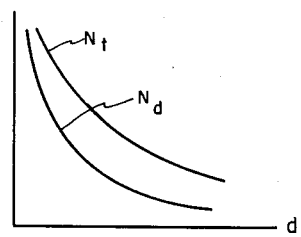
FIG. 2 shows diagrammatically the total number of photons and the number of unscattered photons as a function of the distance from the source of radiation to the detecting element.

The variation of $N_d$ and $N_t$ with $d$ is shown in FIG. 2. It is seen that the total flux $N_t$ intercepted by the detector decreases with the distance $d$ more slowly than the flux $N_d$ due to the direct radiation. Of particular importance in that connection is to note that the ratio of the direct radiation to the total radiation is a measure of the distance. This is readily apparent from (1) and (2) that:

$$R = \frac{N_d}{N_t} = d^K \qquad (3)$$

Figure 3:
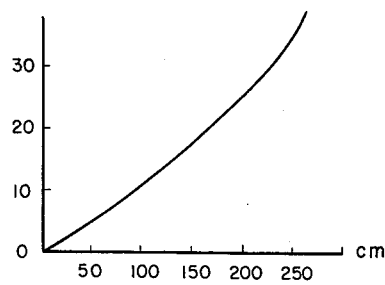
FIG. 3 shows diagrammatically the ratio of the total number of photons to the number of unscattered photons for various distances from the source of radiation to the detecting element.

The relationship between the spectral ratio R and the distance $d$ is illustrated in FIG. 3 in which the values R are represented by ordinates and the values $d$ by abscissas.

Referring now more particularly to FIG. 3, it is seen that the value R representing the spectral index increases progressively with $d$ where $d$ is the distance from the source of the radiation to the detecting element. A very important feature shown in FIG. 3 is the uniqueness of the value R as a function of $d$. That is, to each value of R, corresponds one and only one value of $d$ and conversely to each value of $d$, corresponds one and only one value of R. We can therefore conclude that R can be used as a measure of $d$, i.e. when we measure the spectral index R and refer our measurement to the known graph of FIG. 3, we obtain the distance $d$ that it is desired to determine. Another important feature to be considered is that the graph of FIG. 3 depends only on the energies of the photons emitted by the source 10 and on the scattering properties of the medium 11, but is independent of the strength of the source 10. Thus the present method allows us to determine the distance between a radiation source of an unknown strength and the point of detection. It is noted that no such method existed in the prior art since in accordance with any of the prior methods one can determine the distance from a source of radiation to the point of detection only when the strength of the source was known.

My method can be applied not only to the sources of monochromatic gamma rays, but to any sources of gamma rays provided that the spectral distribution of the gamma rays emitted by said sources is known. In order to practice my method it is necessary to plot in advance the relationship between the spectral index R and the distance $d$ for a given medium and obtain a curve such as shown in FIG. 3. Such a curve can be either calculated or plotted experimentally. In the latter case, we use as a pilot source any source of radiation (small or large) emitting gamma rays of the desired spectral index and we detect these radiations at various distances from the source. Such a measurement can be made by means of the arrangement of FIG. 1 in which the values R as shown on the meter 22 are plotted for various distances $d$ between the pilot source and the detecting crystal 12. The total spectral range of the gamma rays detected by the crystal 12 is subdivided into two ranges: (1) The upper range extending from the value $E_{max}$ down to a suitably chosen value $E_a$; and (2) a lower range covering all the energies smaller than $E_a$. The gate 15 is adapted to transmit pulses corresponding to the upper range and the gate 16 is adapted to transmit pulses corresponding to the lower range. The value $E_a$ separating the upper range from the lower range may be equal, for example, to $E_{max}/4$. We have thus obtained experimentally a graph such as shown in FIG. 3 which is characteristic of the spectral composition of emitted radiation and of the scattering properties of the surrounding medium. It is noted that for the case of a monochromatic source, the graph of FIG. 3 is independent of the strength of the source. In case of a source emitting several spectral lines, the graph of FIG. 3 depends on the strength of the source to a very small extent, and for all practical purposes this dependence may be neglected.

It is apparent that once a curve of the type shown in FIG. 3 has been obtained, we can determine the distance of a source of unknown magnitude in a given medium by measuring the spectral index R of the received radiation as shown in FIG. 1 wherein the value R is shown on the meter 22. The corresponding distance $d$ at which said unknown source is located may be subsequently determined from the graph of FIG. 3, provided said graph has been obtained by means of a pilot source emitting the same spectrum of gamma rays as the unknown source.

Furthermore, we can apply our considerations to the motion of a radioactive source with respect to the observer. Referring again to FIG. 1, we can assume, for instance, that the source 10 either moves away from the detecting element at the point A (the value $d$ increases) or approaches towards the point A (the value $d$ decreases). In the first instance, the spectral index R shown on the meter 22 increases in accordance with the graph of FIG. 3 and in the second instance the spectral index R decreases. It is thus apparent that I have provided a method for determining the motion of a radioactive source with respect to an observer.

Conversely, I can apply my method to a situation in which the source of radiation of unknown magnitude is fixed in space, but the observer is moving with respect to said source. This is the case in radioactivity exploration in which the ore body is located at a determined depth below the earth's surface and an exploring means is moved substantially continuously over an area to be explored. The exploring means may be a radiation detector placed on a moving support. The support may be a vehicle moving over the surface of the earth or an aerial vehicle such as a helicopter moving above the earth's surface.

Figure 4:
FIG. 4 is a diagram illustrating a survey conducted in accordance with this invention employing an airborne detector flying along a predetermined section.
Figure 4:
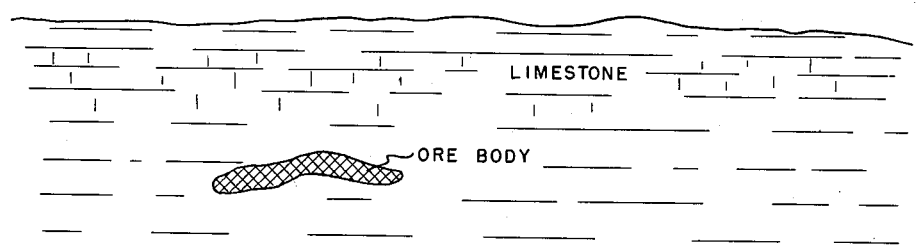

Referring now to FIG. 4, an aircraft, say a helicopter, is shown flying above a traverse at constant elevation with respect to the earth's surface. A vertical plane drawn through the traverse shows a partial geological section. Thus the aircraft in flying from right to left at constant elevation of approximately 200 feet passes over a flat lying ore body, say a lens of uranium ore embedded in limestone.

Figure 6:
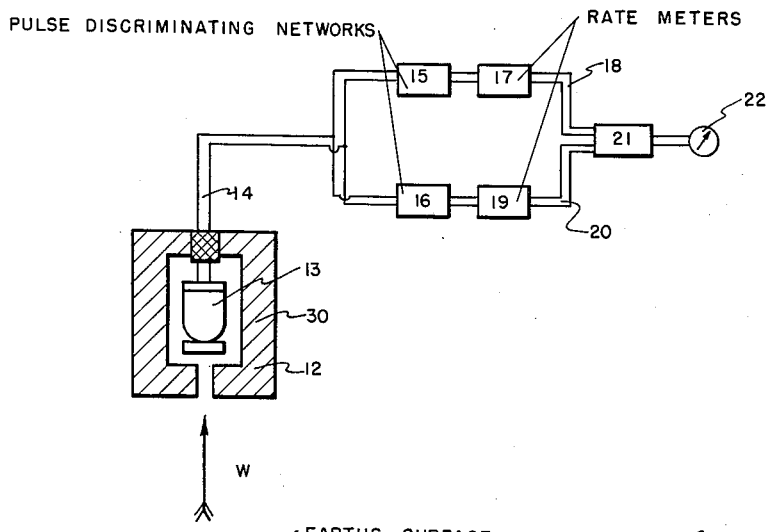
FIG. 6 shows diagrammatically an airborne detector used in the survey of the type used in FIG. 4.

The gamma ray intensity referred to as a plane of constant elevation above the ground is measured by the equipment carried in the aircraft, said equipment being shown more in detail in FIG. 6. As shown in FIG. 6, the incident photons are detected by a scintillation crystal 12 such as sodium iodide. The dimensions of the crystal are sufficiently large so as to absorb substantially completely the incident photons and thus to initiate across the output terminals of the photomultiplier 13 current impulses, each of said current impulses having a magnitude proportional to the energy of the corresponding photon. The crystal is surrounded by a lead shield 30 which absorbs the radiations from all directions except those arriving from the earth along the vertical direction W. Thus the detector is directional since considerably more radiation enters along the vertical W than through the shielded sections.

Except for the presence of the shield W, the detecting and measuring systems shown in FIG. 6 is similar to the one in FIG. 1 and the various elements that are identical in both systems have been designated by the same numerals. Thus the output pulses produced across the output leads 14 of the photomultiplier 13 are selectively transmitted through the amplitude discriminating networks 15 and 16, that transmit impulses corresponding to the region of high energies and the region of low energies, respectively. The output of the networks 15 and 16 are respectively connected to the ratemeters 17 and 19 which in turn have their outputs applied to an electronic divider 21. We thus obtain on the meter 22 in the manner explained hereinabove a value representing the spectral index of the received radiation.

Figure 5:
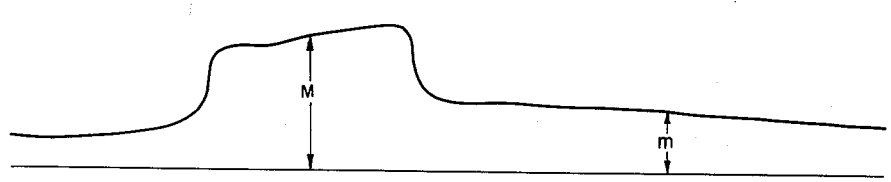
FIG. 5 is a graph of recorded measurements along the section of FIG. 4.

Consider now FIG. 5 showing a graph of the recorded spectral index along the section flown by the helicopter in FIG. 4. Beginning at the left, the spectral index is relatively low, and represents the general background radiations emitted by the limestone. In the diagram of FIG. 5 the spectral index of this background radiation is shown as being equal to $m$. As shown in the figure, the spectral index indicated by the meter 22 increases above the ore body and attains a value M. If M is considerably larger than $m$, the background radiation of the scattering medium (e.g. limestone) may be neglected and the value M can be used to determine the depth at which the radioactive ore is located. In order to determine such depth, it is necessary to have available a graph similar to the one of FIG. 3 showing the relationship between the spectral index R and the depth $d$ for the particular condition encountered in the exploration, i.e. the unknown source being uranium and the scattering medium soil.

In some instances, the spectral index M above the ore body may be higher than $m$, but the difference between the values M and $m$ can be not very large, and therefore, we cannot make the assumption that the scattering medium does not emit any radiation. In such a case the determination of the depth by means of a graph as shown in FIG. 3 becomes less accurate. However, the fact that the spectral index R underwent a change from a value $m$ to a value M is evidence that a source of gamma radiation lies below the overburden. It is thus apparent that by plotting the spectral index in form of a graph such as shown in FIG. 5, we can determine the location of radioactive ore bodies.

I claim:

1. The method of determining, from a relatively remote detecting point, the distance to a source of natural gamma radiation through an intervening scattering medium, said source emitting photons of known energy characteristics, comprising the steps of detecting at such detecting point the photons reaching it from said source, deriving from said detection a succession of electric impulses having magnitudes respectively representative of the energies of said photons, separating said impulses into two ranges of magnitude, one of which ranges is substantially limited to impulses representative of direct undegraded photons from said source, separately determining the occurrence rates of the impulses within each of said two ranges, and comparing said rates of occurrence to derive an index number, the value of said index number indicating the distance of said source.

2. The method of determining, from a relatively remote detecting point, the distance to a source of natural gamma radiation through an intervening scattering medium, said source emitting photons of known energy characteristics, comprising the steps of detecting at such detecting point the photons reaching it from said source, deriving from said detection a succession of electric impulses having magnitudes respectively representative of the energies of said photons, separating said impulses into two ranges of magnitude, one of said ranges including the impulse magnitudes representative of undegraded photons emanating from said source and the other of said ranges embracing the impulse magnitudes representative of photons from said source degraded in energy by scattering through said medium, separately determining the occurrence rates of the impulses within said two ranges of magnitude, and comparing said rates of occurrence to derive an index number, the value of said index number indicating the distance of said source.

3. The method of locating a subterranean source of natural gamma radiation from above the earth's surface, such source emitting photons of known energy characteristics, which comprises the steps of detecting at a relatively remote point the photons reaching it from said source, deriving from said detection a succession of electric impulses having magnitudes respectively representative of the energies of said photons, separating said impulses into two ranges of magnitude, one of which ranges is substantially limited to impulses representative of direct undegraded photons from said source, separately determining the occurrence rates of the impulses within each of said two ranges, comparing such occurrence rates to derive an index number indicative of their respective values, successively repeating such measurements from a plurality of other such detecting points to derive other such index numbers for such other detecting points, and comparing such index numbers with one another.

4. The method of locating a subterranean source of natural gamma radiation from above the earth's surface, such source emitting photons of known energy characteristics, which comprises the steps of detecting at relatively remote point the photons reaching it from said source, deriving from said detection a succession of electric impulses having magnitudes respectively representative of the energies of said photons, separating said impulses into two ranges of magnitude, one of which ranges is substantially limited to impulses representative of direct undegraded photons from said source, separately determining the occurrence rates of the impulses within each of said two ranges, comparing such occurrence rates to derive an index number indicative of their respective values, successively repeating such measurements from a plurality of other such detecting points to derive other such index numbers for such other detecting points, correlating such index numbers with the geographical location of such detecting points and recording the sense and magnitude of the rate of change of such index numbers with changes in such detecting points.

References Cited in the file of this patent

UNITED STATES PATENTS

| | | |
|---|---|---|
| 2,648,012 | Scherbatskoy | Aug. 4, 1953 |
| 2,656,471 | Herzog | Oct. 20, 1953 |
| 2,678,398 | Herzog | May 11, 1954 |
| 2,706,793 | Alvarez et al. | Apr. 19, 1955 |
| 2,712,609 | Herzog et al. | July 5, 1955 |
| 2,740,898 | Youmans | Apr. 3, 1956 |
| 2,752,504 | McKay | June 26, 1956 |
| 2,755,389 | Jones et al. | July 17, 1956 |
| 2,776,378 | Youmans | Jan. 1, 1957 |